2,800,671

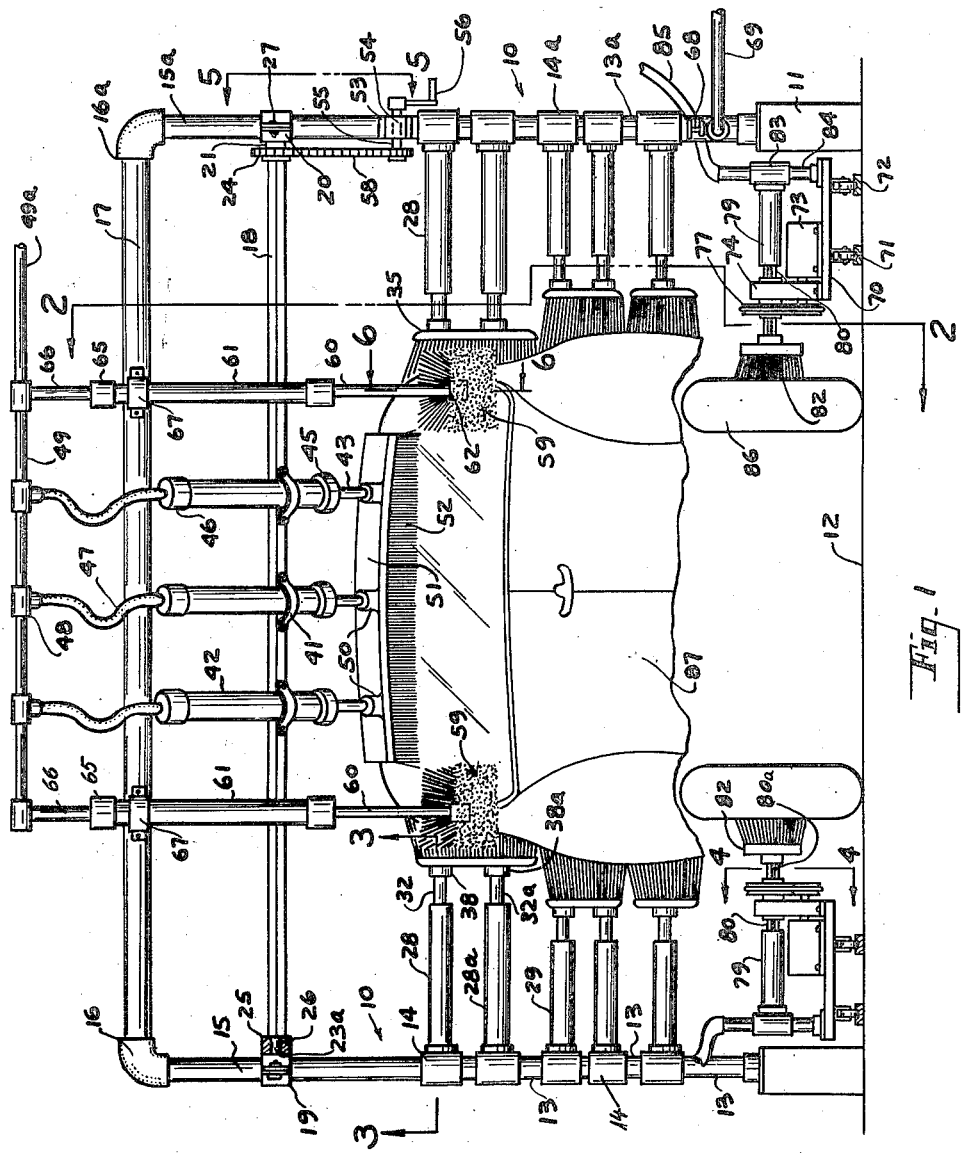

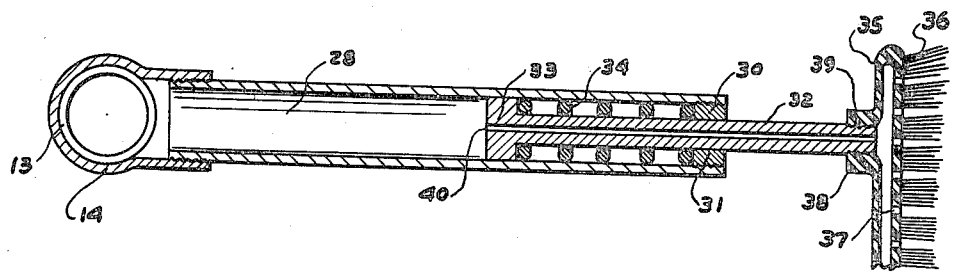

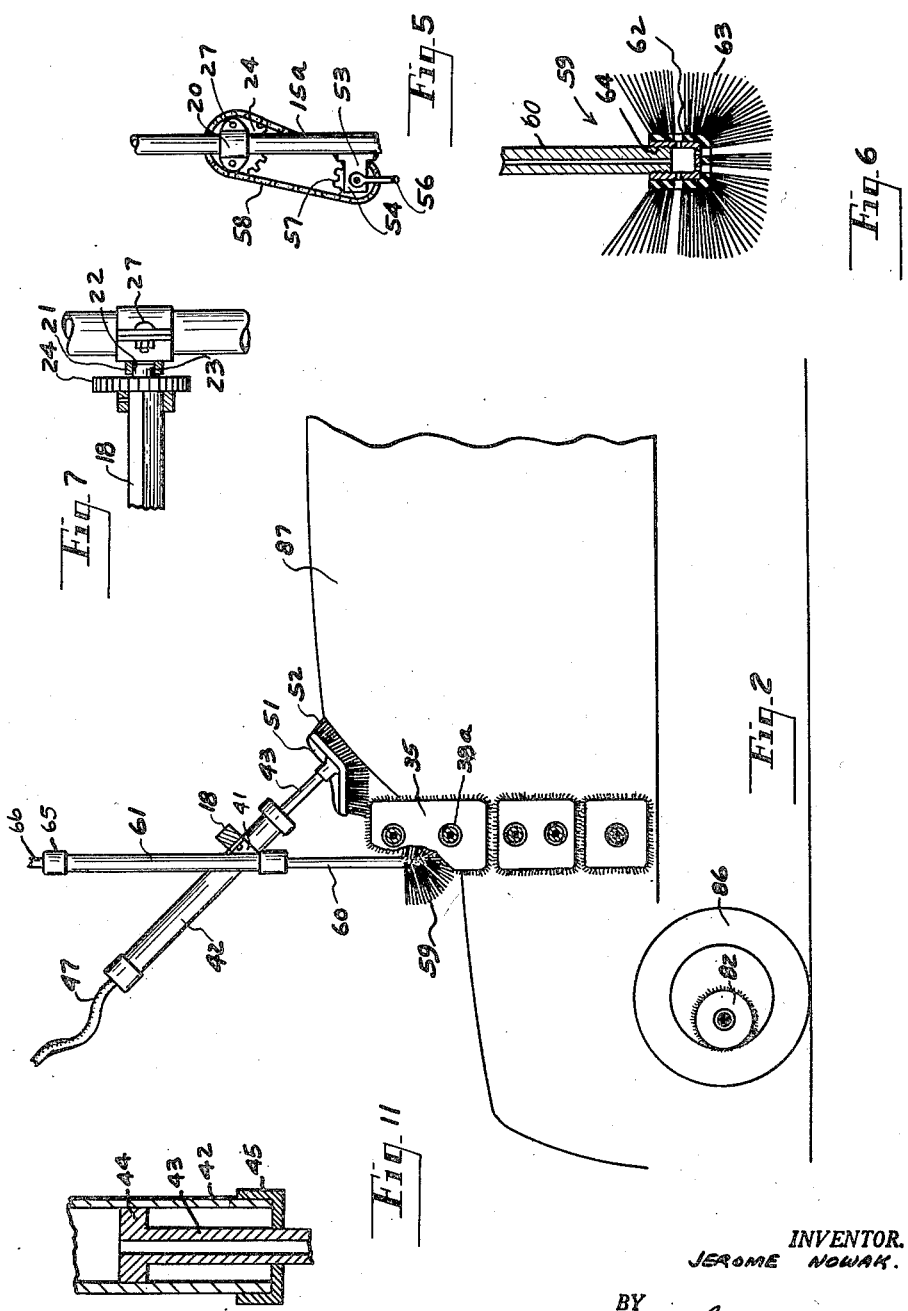

AUTOMOBILE WASHING APPARATUS

Jerome Nowak, Detroit, Mich.

Application April 8, 1954, Serial No. 421,868

4 Claims. (Cl. 15—21)

The apparatus includes a framework forming a gate of dimensions large enough to permit passage of an automobile therethrough and supporting a plurality of brushes for engagement with said automobile in the course of its passage through said gate. The apparatus includes means whereby water is applied to the brushes while they are in an operative engagement with the outer surface of the automobile or some other vehicle which is to be washed.

One of the more specific objects of the invention is to provide means whereby the brushes engaging the body of the automobile will be automatically adjusted to their best operative positions. To accomplish the above purpose, I have devised means to utilize hydraulic pressure of the same water which is to be used to wash the respective automobile.

I shall now describe my improvement with respect to the accompanying drawings in which:

Fig. 1 is a front elevational view of the machine, the view including portions of an automobile to be washed by means of said machine;

Fig. 2 is a sectional view on line 2—2 of Fig. 1;

Fig. 3 is a sectional view on line 3—3 of Fig. 1;

Fig. 4 is a side elevational view of a mechanism forming a part of my apparatus as seen from line 4—4 of Fig. 1;

Fig. 5 is a side elevational view of a detail of construction on line 5—5 of Fig. 1;

Fig. 6 is a sectional view on line 6—6 of Fig. 1;

Fig. 7 is an enlarged side elevational view, partly in section, of a clamp forming a part of the machine;

Fig. 8 is an enlarged vertical sectional view of a standard and means therein to support a pulley;

Fig. 9 is an enlarged sectional view of a modified species of an element used in the machine;

Fig. 10 is an enlarged sectional view of an element of my apparatus;

Fig. 11 is an enlarged sectional view of a part of an element forming a part of the apparatus.

Similar numerals refer to similar parts throughout the several views.

The apparatus, best shown in Fig. 1, comprises a tubular framework which includes two vertical standards 10, each of which is axially mounted in a vertical column 11 rising from a floor 12. Referring first to one of the standards, it will be noted that it is made up of a plurality of short lengths of pipe 13 connected to each other by T-unions 14, the topmost of the T-unions being approximately just below the top level of the average automobile. Extending vertically from the uppermost T-union is a pipe 15 terminating with an L-union 16 for connection to a transversely-disposed pipe 17 leading to a similar L-union 16a at the opposite standard of the framework. Said opposite standard is of identical construction, the component pipes thereof being marked 13a and 15a, while the T-unions are marked 14a.

Located below the pipe 17 is a horizontal bar 18, the ends of which are disposed within supporting clamps 19 and 20, respectively. The clamps are secured to pipes 15 and 15a, respectively, the pipes being component members of their respective standards, as shown in Fig. 1.

The clamp 20 includes a laterally-extending member 21 containing an axial socket 22 for reception of one end 23 of the above-said bar 18, said end being cylindrical in shape for rotation within said socket 22. Mounted upon the bar adjoining said clamp 20 is a sprocket 24. Similarly, the clamp 19 includes a laterally-extending member 25 which contains a socket 26, the latter forming a bearing for the other end 23a of said bar 18. This end is circular in cross-section, permitting the bar to be rotated about its axis within said socket 26. Numeral 27 indicates bolts by means of which a complementary part of each clamp is secured thereto.

Returning to the subject of the standards 10, it will be noted that each T-union 14 supports a horizontal tube 28 or 29, as the case may be, the tubes differing only with respect to their individual lengths. It is one of such tubes, specifically, one of the tubes marked 28, that is shown enlarged, in section, in Fig. 3. The tube, which extends from a T-union 14, is closed at its outer end by a plug 30, the plug being provided with an axial aperture 31. Disposed within the tube is a piston composed of a head 33 and a hollow shaft 32 extending therefrom and passing through said aperture 31 in said plug 30. A coiled spring 34, bearing at one end against said closure 30, bears at the opposite end against said head 33, urging the head of the piston in the direction away from said closure.

Mounted upon the other end of the shaft is a brush consisting of a hollow head or casing 35 and bristles 36, the casing having a plurality of openings 37 through which water may be ejected from the interior of the casing towards said bristles. It will be noted that the brush is supported by two shafts, 32 and 32a, the latter being a part of an assembly which includes another parallel tube of the same length, the tube being marked 28a. The outer ends of the two shafts 32 and 32a, respectively, are fitted into sockets 38 and 38a upon the outer surface of the casing 35 of the brush. Numeral 40 indicates an axial duct in the shaft shown in Fig. 3, the duct serving as a passageway for admission of water from the T-union to the casing of the brush.

Connected to the bar 18 by means of metal bands 41 are a plurality of tubular members 42, each of them containing a piston 44 and a hollow shaft 43 extending downwardly from said tubular member 42 through an aperture in a cap 45 by means of which the member is closed at its lower end. A similar cap 46 at the upper end of said member is connected to a length of a flexible hose 47 which, in turn, is joined, by means of a T-union 48, to a pipe 49 through which water, under pressure, is delivered to said members 42. The hollow shafts 43 are all secured at their respective lower ends within individual sockets 50 on the top portion of a hollow head or casing 51 of an oblong, horizontally-disposed brush. The latter is designed for application to the top portion of an automobile.

The head 51, which has a hollow casing similar in structure to the casing shown in Fig. 3, is provided with numerous small apertures in that portion in which the bristles 52 of the brush are imbedded. The apertures serve as outlets for water from the casing to the bristles. Because of the variation in the contour of automobiles at the top, and in order to have the brush follow said contour of the specific body, the head 51 may be made of rubber to render the head flexible.

As stated herein, the tubular members 42 are clamped to the horizontal bar 18. As it is important that the latter be capable of being turned to a limited degree about its axis, this is effected by means of a sprocket and chain mechanism which is shown in Fig. 5. The mechanism includes a block 53 which is welded to the tube 15a and is provided with a bearing for a stub axle 55. One end of the axle is equipped with a crank 56 for manual operation thereof, and axially keyed to the other end of the axle is a sprocket wheel 57. A chain 58, engaged by said sprocket wheel 57, serves to drive the sprocket wheel 24 shown in Figs. 1, 5, and 7, which sprocket wheel is mounted on bar 18.

For application to the body of the automobile in spaces which are not covered by brushes operating from the sides and from the top, I have provided additional brushes marked 59. These are operated by means of hollow shafts 60, each of which is in a telescopic relation to its own tubular member 61. An individual brush mounted at the outer end of such a shaft 60 includes a cylindrical head 62. The head really forms a hub from which bristles 63 extend radially in all directions, excepting the upper portion of said hub which is threaded internally, as shown at 64, for reception of the outer end of said shaft 60. At the top each tubular member 61 is closed by a cap 65, the cap having an axial aperture therein for connection to a flexible hose 66 leading to the said pipe 49. A clamp 67, welded to the pipe 17, serves to hold each member 61 in place. It will be understood that each tubular member 61 is internally of analogous construction to that shown in Fig. 3, which means that it also contains a piston, mounted upon a hollow shaft, and a coiled spring to keep the piston and the shaft in their normally-retracted positions.

To complete this part of the description, I wish to refer to Fig. 1 in which numeral 68 indicates a valve to control the supply of water to be delivered to the respective brushes by means of a pipe 69.

As the washing of the wheels of an automobile, because of their shape, presents a different problem, I have devised means particularly suitable for that purpose. It is my object that the brushes be mobile and that they follow the automobile in the course of its being washed.

For this reason, as shown in Figs. 1 and 4, I employ on each side of the automobile a platform 70 carried on wheels 71 which are disposed on a track composed of two parallel rails 72. Mounted upon the platform is an electric motor 73 and a standard 74, the latter being provided in its top portion with a bearing 75 for reception of a bushing 76 which at one end supports a pulley 77 adapted to be driven by a belt 78 from the motor 73. The bushing is provided with a radial groove 76a.

Located in an axial alinement with the bushing is a tube 79 which contains a piston analogous in construction to that shown in Fig. 3 and a hollow shaft 80. The shaft, which projects outwardly from said tube 79 and passes through the bushing and the hub portion of the pulley, is provided with a radially-disposed fin 80a. The latter fits slidingly into said radial groove 76a in the bushing so that the rotation of the pulley will impart a rotary movement to the bushing and to said shaft.

At the outer end, the shaft supports a substantially circular or doughnut shaped brush 82 which also contains a hollow head with apertures for release of water towards the brushes, the structure being analogous to that shown in Fig. 3. The brush is to be applied to the rim, the webbing, and the hub cap of an automobile wheel 86, it being one of the wheels supporting the body of an automobile 87.

Fig. 9 discloses a modification in the structure of one of the tubes in which a hollow shaft is in a telescopic relation thereto. In this case, the tube, which is generally indicated by numeral 90 but which is analogous to tube 28, is closed at its operative end by a cap 91. The cap contains an axial aperture 92 for a frictionless passage of a hollow shaft 93, while the cylindrical wall of the cap is provided with a plurality of radial apertures each of which contains a set screw 94. The inner end of each screw is slightly hollowed for engagement with a ball 95, the balls jointly forming a bearing for said shaft 93 to permit low-friction movement longitudinally of said shaft.

Fig. 10 shows a detail of construction pertaining to the piston in one of the tubes 79 and containing a shaft 80 for support of a brush 82. The piston, marked 96, has an axial aperture 97 which serves as a bearing for said shaft 80. At the outer end, which is its operative end, the tube 79 is provided with an internal annular member, said member being out of contact with the shaft but serving as a means of containing in the tube a coiled spring 99.

I shall now describe the operation of the machine, confining my self particularly to those parts thereof which are new.

For the purpose of being washed, the automobile is either conveyed by some mechanical means or pushed manually through the gate which forms the framework of the machine. For the operative use of the brushes, water, under pressure, has to be supplied thereto. The water, entering the standards forming the vertical side members of the framework, enters the respective horizontal and vertically-disposed tubes and acts upon the pistons contained in said tubes.

Restricting myself to the operation of one of such tubes, as, for instance, the tube shown in Fig. 3, I will deal with the operation of the brush which, by intermediate means, projects from that tube. As the pressure of water derived from customarily available municipal water mains is considerable, the inflow of water into said tube 28 will act upon the movable piston 33, pushing it outwardly against the tension of the coiled spring 34 till the brush, carried by the hollow shaft 32, encounters the body of the automobile. As the shaft is hollow, the water, being under pressure, will be delivered to the casing of the brush and will be released therefrom through the bristles towards said body of the automobile. As the flow of water is considerable, it will first soften the layer of dirt upon the surface of the automobile and then carry it away. Should the water be turned off, the spring will automatically return the piston to its normally withdrawn position and cause the brush, controlled by said piston, to be withdrawn from its operative engagement with the automobile.

As shown in Fig. 1, said tubes 28 and 29 appear to extend at right angle to the body of the automobile. It will be understood that this particular angle is not critical and that it is even desirable that the tubular member be disposed at a slight angle, that is, that they be deflected in the direction in which the automobile moves in the course of its being washed.

It is also for the best angle of operation that the apparatus is provided with said rotary bar 18 which, by means of the crank 56, may be turned about its axis to such a position as to secure the best angle for the operation of the wide brush for the washing of the top of the automobile body. This is particularly desirable in view of the varied outlines of automobiles, as seen in side elevation.

The operation of the brushes applicable to the wheels of the automobile is, in some respects, different. In this case, the pipe 84 which supplies water to tube 79, and the tube itself, are mounted on a platform 70 which is to be moved along the wheel at the same speed as that of said wheel. The shaft 80, which fits telescopically into said tube 79, is also forced outwardly for operative contact with the wheel by water pressure, but in this case the shaft is made to rotate about its axis by the electric motor to impart a rotary movement to the brush.

It will be understood that a number of changes can easily be made in the structure of the many elements described in this specification without departing beyond the range of equivalents of the features disclosed herein.

What I, therefore, wish to claim is as follows:

1. In an automobile washing apparatus including a stationary framework of pipes forming a gate for admission of an automobile, said pipes being connected to form a passageway therethrough, valve means upon said framework for admission of water under pressure from a source of supply, a plurality of straight tubes extending from said framework in the direction of said automobile, each tube being at one end open into said passageway and containing a piston said piston having an axial aperture and a hollow shaft extending therefrom and outwardly of the other end of the tube, a brush at the outer end of each shaft, each brush including a hollow casing provided with a plurality of openings on the side carrying the bristles of the brush, and spring means to keep the shaft in a normally retracted position, the piston being adapted to be pushed by pressure of water delivered through the pipes of the framework against said piston to bring the brushes on the shafts into operative position with respect to said automobile.

2. A framework of pipes including two upright members and a transversely-disposed member at the top thereof, the pipes forming a passageway for water, valve means on the framework for admission into the pipes of water under pressure from a source of supply, a plurality of straight tubes extending from each upright member in the direction of the other upright member and from the transverse member downwardly, each tube being at one end open into the respective member, each tube containing a piston including a head having an axial aperture therein and an axially-disposed hollow shaft extending outwardly of the tube, a brush on the outer end of the shaft, each brush including a hollow casing provided with a plurality of openings on the side carrying the bristles of the brush, and spring means in each tube to keep the piston in a normally retracted position, the pipes of the framework serving to deliver water under pressure to said brushes through the hollow shafts and to cause the pistons to carry the brushes into their operative positions against the tension of said spring means.

3. In an apparatus for washing auto vehicles including a framework of pipes, forming a gate for admission of an automobile, said pipes being connected to each other to afford a passageway therethrough, a plurality of straight tubes, each being at one end connected to a pipe of the framework and opening into said pipe and each containing an axially apertured piston and a hollow shaft extending outwardly therefrom through the opposite end of said tube, valve means on the framework for admission of water under pressure into said pipes, spring means to keep the piston in a normally withdrawn position, a bristle type of a brush mounted on the outer end of the shaft, the brush having a hollow casing provided with a plurality of openings therein on the side carrying the bristles, and spring means to keep the piston in a normally retracted position, the piston being adapted to be actuated by said water under pressure and against the tension of said spring means towards the other end of the tube to move the brush, by means of said shaft, into its operative position, the hollow shaft being adapted to deliver water to the casing of the brush for release through said openings.

4. In an apparatus to wash automobiles, including a framework made of rigid pipes to supply water for the purpose, in combination, a horizontal bar pivotally supported at its ends for rotation about its axis within a bearing carried by said framework, a plurality of straight tubes open at both ends transversely secured to said bar in a spaced relation to each other, each tube containing a telescopically-disposed hollow shaft extending outwardly of the tube, a brush on the outer end of the shaft, each brush including a hollow casing provided with a plurality of openings on the side carrying the bristles of the brush, spring means to keep the shaft in a normally retracted position, and hose means to connect each tube to the rigid pipes to admit water under pressure from said pipes to each tube and through the shaft to the brush, each shaft being adapted to bring its brush in response to water pressure from the pipes and against the tension of said spring means into operative engagement with the body of the automobile to be washed.

References Cited in the file of this patent
UNITED STATES PATENTS

| | | |
|---|---|---|
| 2,215,692 | Fleming | Sept. 24, 1940 |
| 2,480,735 | Holmes | Aug. 30, 1949 |
| 2,579,866 | Rosseau | Dec. 25, 1951 |
| 2,658,216 | Shusett | Nov. 10, 1953 |
| 2,716,767 | Davis | Sept. 6, 1955 |